US00RE45602E

(19) United States
(12) Reissued Patent
Bardehle et al.

(10) Patent Number: US RE45,602 E
(45) Date of Reissued Patent: Jul. 7, 2015

(54) METHOD AND ARRANGEMENT FOR REGISTERING AND EVALUATING ENERGY CONSUMPTION

(71) Applicant: Siemens Enterprise Communications GmbH & Co. KG, Munich (DE)

(72) Inventors: Lutz Bardehle, Salzkotten-Upsprunge (DE); Dieter Klaus, Delbruck (DE); Thorsten Laux, Paderborn (DE)

(73) Assignee: Siemens Enterprise Communications GmbH & Co. KG, Munich (DE)

(21) Appl. No.: 14/016,556

(22) Filed: Sep. 3, 2013

Related U.S. Patent Documents

Reissue of:
(64) Patent No.: 8,013,757
Issued: Sep. 6, 2011
Appl. No.: 11/821,428
Filed: Jun. 22, 2007

U.S. Applications:
(60) Provisional application No. 60/928,301, filed on May 9, 2007.

(51) Int. Cl.
*G08B 23/00* (2006.01)
*G06Q 10/08* (2012.01)

(52) U.S. Cl.
CPC ..... *G06Q 10/08* (2013.01)

(58) Field of Classification Search
USPC ..... 340/870.02–870.03, 658; 702/186; 700/291
See application file for complete search history.

(56) References Cited

U.S. PATENT DOCUMENTS

| | | | | |
|---|---|---|---|---|
| 3,602,703 | A * | 8/1971 | Polenz | 700/291 |
| 6,772,052 | B1 * | 8/2004 | Amundsen et al. | 700/291 |
| 6,816,078 | B2 * | 11/2004 | Onoda et al. | 340/658 |
| 6,865,450 | B2 * | 3/2005 | Masticola et al. | 700/291 |
| 7,349,828 | B1 * | 3/2008 | Ranganathan et al. | 702/186 |

* cited by examiner

*Primary Examiner* — Albert Wong
(74) *Attorney, Agent, or Firm* — Buchanan Ingersoll & Rooney PC

(57) ABSTRACT

Registering energy consumption in part of a building, an item of state information of at least one energy load being acquired, the state information being transmitted to a control center, and the state information, a state duration and a specific statement of the consumption of the energy load being used to determine and evaluate the energy consumption in the control center. It is possible to dispense with separate energy consumption measuring units as a result of the energy consumption being registered by multiplying the switched-on duration by a specific statement of the energy consumption (that is to say power) of the energy load.

20 Claims, 1 Drawing Sheet

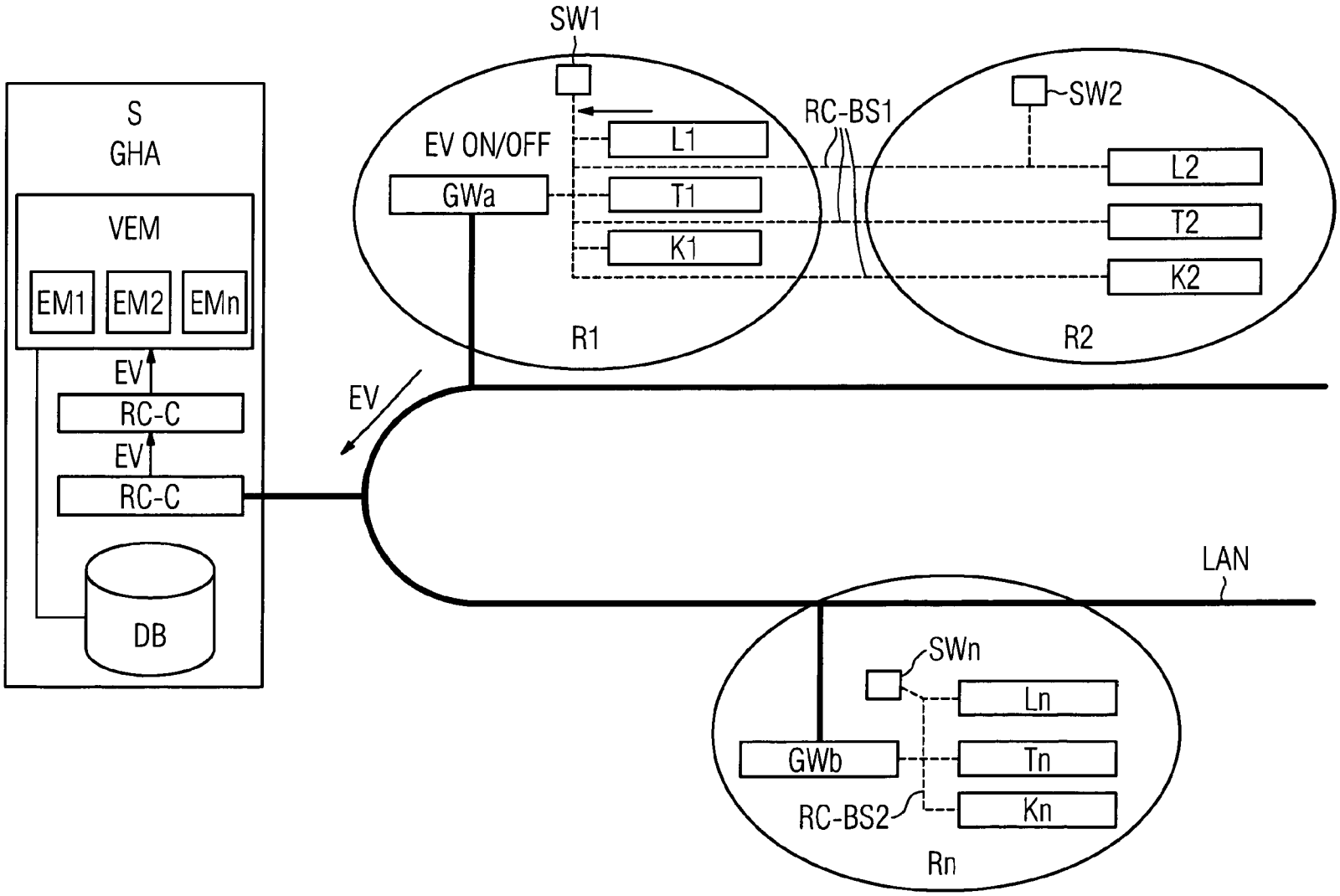
SW1
EV ON/OFF
GWa
L1
T1
K1
R1
RC-BS1
SW2
L2
T2
K2
R2
EV
LAN
SWn
Ln
Tn
Kn
GWb
RC-BS2
Rn
S
GHA
VEM
EM1
EM2
EMn
EV
RC-C
EV
RC-C
DB

METHOD AND ARRANGEMENT FOR REGISTERING AND EVALUATING ENERGY CONSUMPTION

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

The present application claims the benefit of the provisional patent application filed on May 9, 2007, and assigned application No. 60/928,301, and is incorporated by reference herein in its entirety.

FIELD OF INVENTION

The present application relates to a method and arrangement for registering and evaluating energy consumption.

BACKGROUND OF INVENTION

The energy consumption of electrical and non-electrical loads, for example lighting devices, heating systems, air-conditioning units etc., is often registered (measured) in order to be able to invoice the costs in a manner dependent on consumption. In an analogous manner to a water meter which registers a quantity of water consumed, electricity meters are used to register the energy consumption of electrical loads and measuring units for a quantity of fuel (for example gas meters) are used to register the energy consumption of combustion devices. In the course of increased energy costs and a heightened environmental awareness, there is also often the desire in hotels, motels and similar facilities to register the consumption of resources (in particular the consumption of electrical energy) separately for each room or each suite and thus for each guest and to charge the customer (guest) separately. In this case, different "bonus schemes" may also be offered to the guests, for example in such a manner that, when a particular threshold value for the energy consumption is undershot, the guest is awarded a bonus or is promised some other benefit.

It has been found that it is very complicated to register the energy consumption separately for each guest or each room (suite) in a hotel or a similar facility because a separate meter, that is to say a separate measuring device, must be used for each point of consumption or part of a building (for example a room), this measuring device also having to be equipped for data transmission of the measured consumption value to a control center (in this case: the hotel reception).

SUMMARY OF INVENTION

The invention makes use of the fact that many hotels already have a building management system with a corresponding data bus. Such a data bus, for example an EIB (European Installation Bus), networks switching devices (for example light switches) and loads (for example lights, air-conditioning units, blinds etc.) in a building, with the result that the individual load is not switched on and off using a separate circuit but rather the individual switching devices (light switches, heating thermostat etc.) transmit only switching commands into the network which are evaluated and executed by the corresponding loads or switching devices connected upstream of the latter. According to the invention, these switching commands or resultant "response messages" or "status messages", which are also referred to as "events", may be recorded in a central device, for example a computer/server in a hotel reception. This makes it possible to register the switched-on duration of individual loads, for example the lighting or heating system of a hotel room, and to multiply it by the specific energy consumption (that is to say the electrical power) of the load, with the result that the energy consumption can be registered without having to provide a corresponding separate measuring unit for each room.

The invention thus provides a method for registering energy consumption in part of a building, an item of state information of at least one energy load being acquired, the state information being transmitted to a control center, and the state information, a state duration and a specific statement of the consumption of the energy load being used to determine and evaluate the energy consumption in the control center. This method forms a "virtual consumption measuring unit" ("virtual electric meter"), in which case a multiplicity of measuring points can be registered with little effort, in particular in those arrangements which already have an installation bus or a similar data network.

The achievement of the object also provides an arrangement for registering energy consumption in part of a building, said arrangement having a switching device for controlling an energy load, having a bus system for transmitting information from the part of a building to a control center, having the control center for acquiring and evaluating information which has been transmitted by the switching device to the control center via the bus system, the switching device being set up to transmit statements of the switching operations, which concern the energy load, to the control center, and the control center being set up to determine the switched-on duration of the energy load using the statements of the switching operations, to weight this switched-on duration using a statement of a specific statement of the consumption of the energy load for the purpose of determining the energy consumption, and to evaluate the energy consumption which has been determined. In this case, the saving in terms of the energy consumption measuring units which are not required is higher, the more parts of a building (rooms or the like) are registered.

Advantageous refinements of the method according to the invention are specified in the dependent patent claims. The features and advantages mentioned in this case also analogously apply to the arrangement according to the invention. It goes without saying that a plurality of the features and advantages mentioned in the dependent claims may also simultaneously apply to the method according to the invention and the arrangement according to the invention.

Either a statement of a change in an operating state, a statement of an operating time of the energy load or both may be used as the state information. If the operating time is registered in this case in the switching device itself, the strain on the control center is relieved, and, in addition, there is thus no need to report every individual switching operation to the control center. In the situation in which every switching operation is reported to the control center, the individual switching devices may be of simpler design, a real-time clock which is contained in the control center (for example the server) anyway advantageously being able to be used to determine the switched-on duration of a (an electrical) load (energy load).

Alternatively or additionally, a statement of an operating intensity of the energy load may be used as the state information, the statement of the operating intensity being used to weight the specific statement of the consumption in the control center. This makes it possible to take into account the fact that, for example, a dimmed light or an air-conditioning system that is operated at reduced power will have a lower energy consumption in any unit of time than a load which is operated at full power.

The method can be used in a particularly advantageous manner in the case of those loads which have a virtually constant power consumption and a relatively high specific energy consumption during operation, for example lighting devices, heating systems and/or air-conditioning devices, whereas small loads (for example clock radios) or rarely used loads (for example trouser presses) can be excluded from the registering operation. The devices mentioned last then also do not need to be connected using a "network-compatible" switching device, thus making it possible to reduce the costs of the building management system or the installation bus.

The method can be used in a particularly advantageous manner for hotel rooms or hotel suites because a calibrated energy consumption measurement is not required there and the components needed for the method ("room control components", bus system) are also frequently already present anyway.

A computer or a server is advantageously used as the control center, additional software on an already existing computer (for example "front-desk workstation" in a hotel reception) also being able to be used for this purpose.

A comparison with a predefined threshold value for the energy consumption can be determined for the purpose of evaluation, in particular for the application (already mentioned) in the hotel industry. This simplifies the operation of invoicing a service ("hotel bill"). In addition, the customer (hotel guest) can be advantageously regularly presented with information relating to "achievement of objectives"; for example, a graph which visualizes the guest's energy consumption or the devices used by the guest can be displayed for the guest using the television in his room.

The state information is advantageously acquired using a switching device which is installed in the part of a building. As a result, the cabling in the part of a building and in the entire building can have a simple structure and can be cost-effective.

The state information is advantageously transmitted to the control center via a data network, a bus system for a building controller, for example a "room control system", or a building management system being used as the data network. Alternatively, the state information can also be transmitted using Ethernet, a W-LAN or another customary data network which is often already present, for which purpose the individual switching devices and/or the control center is/are provided with a corresponding gateway ("IP gateway"). To this end, for example, a central computer of a building management system (room control system) can also be centrally connected to a hotel desktop system or another management system using a single IP gateway.

A statement of the energy consumption which has been determined can be advantageously also used to control at least one further energy load in the part of a building. This makes it possible, for example, to automatically reduce a desired value for a heating system if all of the lighting devices in a hotel room are switched off in the evening (that is to say in a defined time zone) because "sleep" is then assumed. The control center advantageously has a database in which at least one operating state is linked to the specific statement of the consumption. This makes it possible, for example, to link the "full load" operating state of a registered heating unit to a statement of higher consumption and to link a "half-load" operating state of the same unit to a more specific statement of lower consumption. This makes it possible to register energy consumption in a more accurate manner.

Exemplary embodiments of the method according to the invention are explained below using the drawing. They are simultaneously used to explain an arrangement according to the invention.

BRIEF DESCRIPTION OF THE DRAWINGS

In this case, the single FIGURE diagrammatically shows an arrangement comprising a control center (server) and four parts of a building (rooms), which are networked using a data network (LAN).

DETAILED DESCRIPTION OF INVENTION

A method and an arrangement for a hotel, in which hotel guests are intended to be encouraged to use the room resources in an environmentally aware manner, are shown below as an exemplary embodiment of the present invention. It goes without saying that the method according to the invention and the arrangement may also be used without restriction in other fields of application in which energy consumption or resource consumption is intended to be determined.

In the FIGURE, the rooms R1, R2, Rn in a hotel are shown as the parts of a building under consideration. Said rooms are networked using a network LAN, in this case: a customary computer network. A server S which is arranged, for example, in the hotel reception is likewise connected to the network LAN. The components in the rooms R1 and R2 are networked using the bus system RC-BS1 ("room control bus system"), whereas the room Rn has its own bus system RC-BS2. Switches SW1, SW2, SWn are respectively connected to the bus systems RC-BS1, RC-BS2; for reasons of clarity, the FIGURE illustrates only three switches, whereas a multiplicity of different switches and control elements (for example also thermostats, dimmer switches etc.) may also be arranged in a real application. Different loads L1, L2, Ln (lights), K1, K2, Kn (air-conditioning units) and different sensors T1, T2, Tn (temperature sensors) are connected to the bus system RC-BS. In this case, the switches SW1, SW2, SWn and the sensors T1, T2, Tn control the loads L1, L2, Ln, K1, K2, Kn by transmitting switching commands via the networks RC-BS. The switches SW1, SW2, SWn and the sensors T1, T2, Tn are collectively referred to below as "switching devices". The switching devices transmit commands to the loads. In return, the loads respond with events which represent/comprise the current state of the element (load or the like). In addition, the loads are able to transmit events, which reflect a state that has possibly changed, asynchronously, that is to say without a previous command The events thus comprise state information and information (addresses) for identifying the transmitting load. In this respect, it should be noted that each load need not necessarily be directly equipped with an evaluation unit for the commands but rather ballasts which evaluate the corresponding commands and then use them to control the corresponding load may also be used. These ballasts are likewise suitable for generating events EV.

The bus systems RC-BS1, RC-BS2 shown here are constructed in accordance with the known EIB (European Installation Bus); it goes without saying that any other building management system or a similar device may also be used. The bus systems RC-BS1, RC-BS2 are provided with gateways GWa, GWb which translate the events EV into messages (IP datagrams; IP=Internet Protocol) which can be transmitted to the server S using the network LAN. Conversely, commands and events EV may also be generated by the server S, transmitted to the gateways GWa, GWb using the network LAN, transferred to the data format of the bus systems RC-BS there and fed into the bus systems RC-BS1, RC-BS2.

The server S is provided with an application program GHA ("green hotel application") which registers, documents and evaluates the consumption of resources (for example energy consumption) of the individual parts of a building or guests and thus of the individual rooms R1, R2, Rn. To this end, a consumption meter EM1, EM2, EMn ("electric meter") is provided for each room R1, R2, Rn and thus for each hotel guest, said consumption meters being software parts of a component VEM ("virtual electric meter") in the form of a virtual consumption registering device. The server S is set up to receive the events EV via the network LAN, a component RC-C (room control connector) being set up to receive the messages containing the events EV. The events EV are extracted from the messages by the component RC-C, that is to say the "overhead", which essentially comprises the TCP-IP headers of the network data transmission, is removed from the messages, so that the component RC-C forwards the pure events EV to an evaluation unit RC-E (room control eventing).

In this evaluation unit RC-E, all of those commands and events which are used to control loads or result from the latter (for example switching commands and "status" events of the lights) are forwarded to the component VEM, the addresses used in the commands and events EV (alternatively, only the events EV may also be evaluated) being used to evaluate the room and the load to which the corresponding event EV is linked. To this end, the database DB, in which the addresses are assigned to the rooms R1, R2, Rn or the units in correlation tables, is accessed. This information, that is to say the events EV which have been evaluated, is used in the component VEM to update the consumption meters for the individual rooms R1, R2, Rn and the hotel guests associated with the latter. To this end, the switch-on time, the switch-off time and, if appropriate, a statement of the intensity or a change in the intensity are recorded for each load L1, L2, Ln, K1, K2, Kn. If, following a switch-on operation, a switch-off operation is recorded for one of the loads L1, L2, Ln, K1, K2, Kn at a later point in time, the switched-on duration is determined and a specific statement of the consumption (consumption FIGURE) is interrogated by accessing the database DB. In the case of a light for example, the specific statement of the consumption is a statement of the power in watts; in the case of other loads, for example gas-operated heating devices, it may also be a statement of gas volume per hour or the like. The switched-on duration, the specific statement of the consumption and, if appropriate, the statement of intensity are used to update the consumption meter EM1, EM2, EMn in the respective room R1, R2, Rn. In this case, the corresponding consumption values may also be transmitted to another component at regular intervals of time, for example in order to continuously or regularly inform a guest of "his" energy consumption. When the guest is checking out at the latest, the respective consumption value can also be used to calculate a statement of consumption costs or to determine that a threshold value has been overshot or undershot. Benefits can thus be provided if the guest's behavior is conscious of the resources in order to reward behavior that saves resources or the like.

When high energy consumption of the lighting or heating system is detected, the server S can use a "return channel" to turn down or switch off the air-conditioning system (loads K1, K2, Kn), for example, in order to save energy.

The invention claimed is:

1. A method for registering energy consumption comprising:

a first switching device acquiring first state information of at least one first load, the first switching device and the at least one first load associated with a first room of a plurality of rooms in a building;

a second switching device acquiring second state information of at least one second load, the second switching device and the at least one second load associated with a second room of the plurality of rooms in the building;

the first switching device transmitting the first state information to a control center via a data network;

the second switching device transmitting the second state information to the control center via the data network;

determining a first duration of operation of the at least one first load based on the first state information;

determining a second duration of operation of the at least one second load based on the second state information;

determining a first statement of consumption of the at least one first load, the first statement of consumption comprising a first rate of energy consumption of the at least one first load;

determining a second statement of consumption of the at least one second load, the second statement of consumption comprising a second rate of energy consumption of the at least one second load;

the control center evaluating a first amount of energy consumption of the at least one first load, the evaluating the first amount of energy consumption comprising determining if the at least one first load is operational from the first state information and multiplying the first duration of operation by the first statement of consumption to assess the first amount of energy consumption if the at least one first load is operational; and the control center evaluating a second amount of energy consumption of the at least one second load, the evaluating the second amount of energy consumption comprising determining if the at least one second load is operational from the [first] *second* state information and multiplying the second duration of operation by the second statement of consumption to assess the second amount of energy consumption if the second state information indicates the at least one second load is operational; and wherein the control center comprises at least one server; and wherein the control center uses the first amount of energy consumption in a first billing function for energy consumption in the first room; and wherein the control center uses the second amount of energy consumption in a second billing function for energy consumption in the second room.

2. The method of claim 1 further comprising the control center storing the first state information and the second state information in a database, the database correlating the first state information to the first statement of consumption and correlating the second state information to the second statement of consumption.

3. The method of claim 2 wherein the at least one first load comprises a plurality of first loads and the method further comprising the control center automatically adjusting an operating state of one load of the plurality of first loads based on an operating state of another load of the plurality of first loads via the first switching device.

4. The method of claim 1 wherein the plurality of rooms in the building comprise a plurality of hotel rooms in a hotel.

5. The method of claim 4 wherein the first billing function is used to obtain an invoice for a guest of the first room of the hotel, wherein the guest receives a pecuniary benefit if the first amount of energy consumption is below a predetermined value.

6. The method of claim 1 wherein the data network comprises a Wireless Local Area Network (WLAN), a Local Area Network (LAN), or an Ethernet network.

7. The method of claim 4 further comprising displaying the first amount of energy consumption of the at least one first load compared to a predetermined value of energy consumption to a guest in the first room.

8. The method of claim 1 wherein the at least one first load comprises a plurality of first loads, wherein the plurality of first loads comprises an electrically operated device and a gas operated device.

9. The method of claim 1 wherein determining the first duration of the at least one first load based on the first state information is performed in the first switching device.

10. The method of claim 1 wherein the control center and the data network are located inside the building.

11. A system for registering energy consumption, comprising:

a first switching device for controlling an operating state of at least one first load and acquiring first information about the operating state of the at least one first load, the first switching device and the at least one first load being associated with a first room of a plurality of rooms;

a second switching device for controlling an operating state of at least one second load and acquiring second information about the operating state of the at least one second load, the second switching device and the at least one second load being associated with a second room of the plurality of rooms;

a data network for communicating the first information about the operating state of the at least one first load and the second information about the operating state of the at least one second load;

a control center for evaluating the first information and the second information; and wherein the first switching device transmits the first information to the control center via the data network; and wherein the second switching device transmits the second information to the control center via the data network; and wherein the control center comprises at least one server; and wherein the control center determines a first duration of the operating state of the at least one first load and a first statement of consumption of the at least one first load based on the transmitted first information, the first statement of consumption comprising a first rate of energy consumption of the at least one first load; and wherein the control center determines a second duration of the operating state of the at least one second load, and a second statement of consumption of the at least one second load based on the transmitted second information, the second statement of consumption comprising a second rate of energy consumption of the at least one second load; and wherein the control center determines if the at least one first load is operational from the first information and multiplies the first duration by the first statement of consumption to obtain a first amount of energy consumption if the at least one first load is operational; and wherein the control center determines if the at least one second load is operational from the second information and multiplies the second duration of operation by the second statement of consumption to obtain a [first] *second* amount of energy consumption if the at least one second load is operational; and wherein the control center uses the first amount of energy consumption in a first billing function for energy consumption in the first room; and wherein the control center uses the second amount of energy consumption in a second billing function for energy consumption in the second room.

12. The system of claim 11 wherein the control center stores the first information and the second information in a database, the database correlating the first information to the first statement of consumption and correlating the second information to the second statement of consumption.

13. The system of claim 11 wherein the at least one first load comprises a plurality of first loads and wherein the control center automatically adjusts an operating state of one load of the plurality of first loads based on an operating state of another load of the plurality of first loads via the first switching device.

14. The system of claim 11 wherein the plurality of rooms in the building comprise a plurality of hotel rooms in a hotel.

15. The system of claim 14 wherein the control center uses the first billing function to obtain an invoice for a guest of the first room of the hotel, wherein the guest receives a pecuniary benefit if the first amount of energy consumption is below a predetermined value.

16. The system of claim 11 wherein the data network comprises a Wireless Local Area Network (WLAN), a Local Area Network (LAN), or an Ethernet network.

17. The system of claim 11 wherein the control center causes a comparison between the first amount of energy consumption of the at least one first load to a predetermined value of energy consumption to be displayed, wherein the comparison is displayed to a guest of the first room of the hotel.

18. The system of claim 17 wherein the comparison is displayed to the guest at predetermined intervals.

19. The system of claim 11 wherein the at least one first load comprises a plurality of first loads, wherein the plurality of first loads comprises an electrically operated load and a gas operated load.

20. The system of claim 11 wherein the control center and the data network are located inside the building.

* * * * *